Feb. 11, 1947. L. IVERSEN 2,415,428
SHEARING OF METAL STRIP
Filed April 21, 1945 4 Sheets-Sheet 1
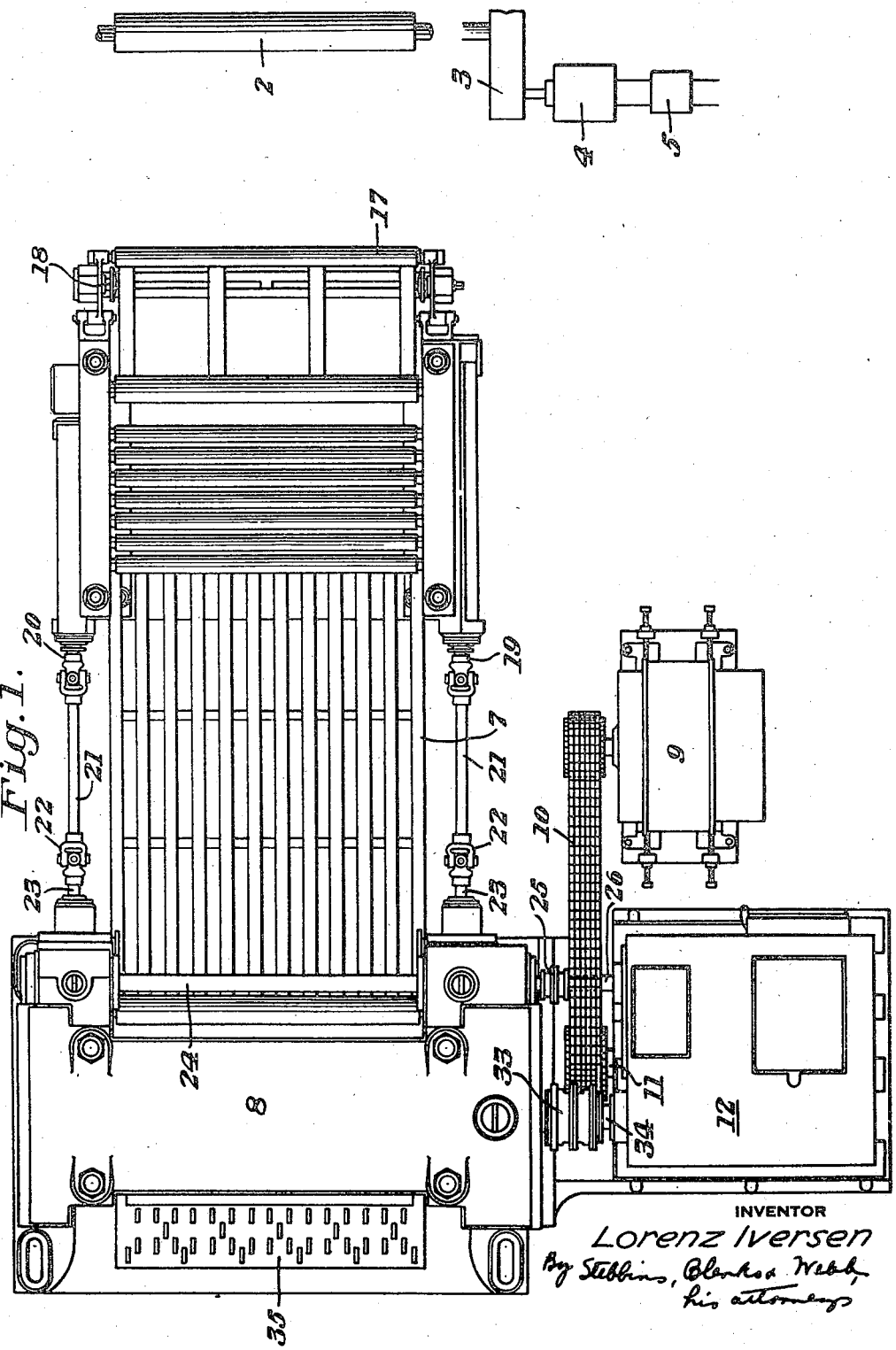

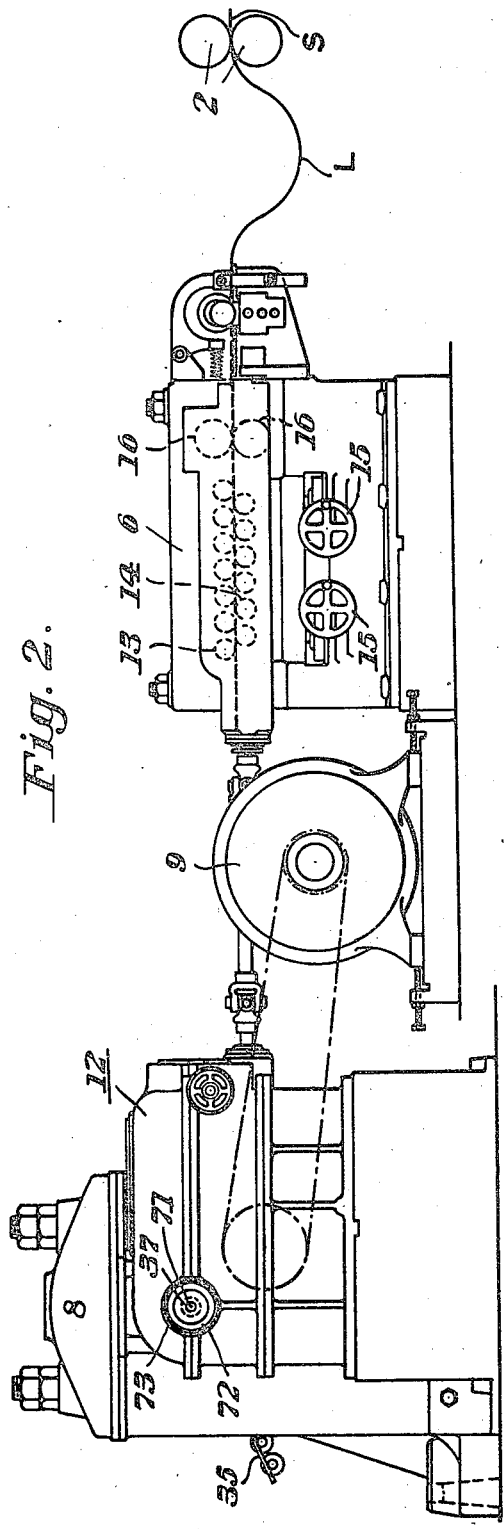

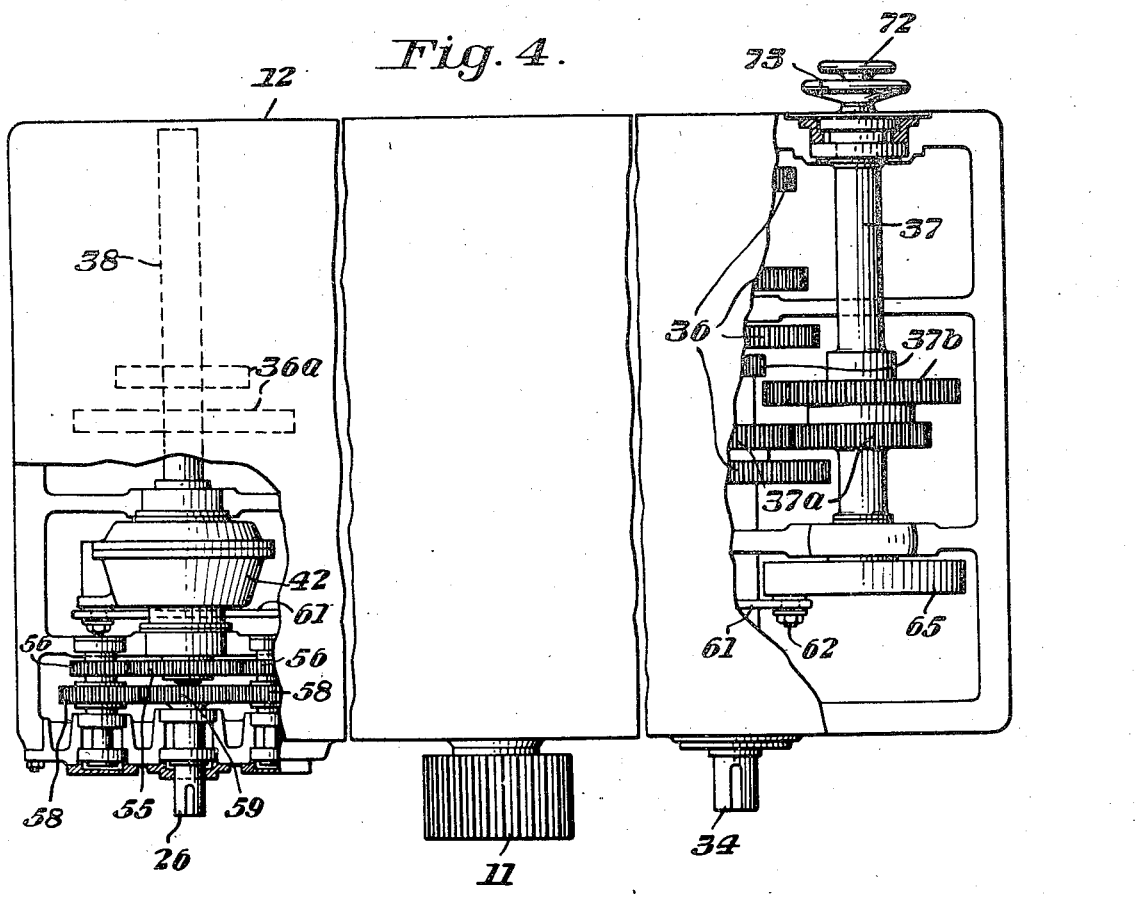

Feb. 11, 1947.   L. IVERSEN   2,415,428
SHEARING OF METAL STRIP
Filed April 21, 1945   4 Sheets-Sheet 4

INVENTOR
Lorenz Iversen

Patented Feb. 11, 1947

2,415,428

UNITED STATES PATENT OFFICE 2,415,428

SHEARING OF METAL STRIP

Lorenz Iversen, Pittsburgh, Pa., assignor to Mesta Machine Company, Pittsburgh, Pa., a corporation of Pennsylvania Application April 21, 1945, Serial No. 589,512

11 Claims. (Cl. 164—68)

This invention relates to the shearing of metal strip and is particularly useful for the cutting of long strips, such as are produced in modern cold reducing mills, into the shorter lengths frequently required in commerce. The problem is to cut successive pieces to the desired length within close tolerances, to adjust the cut lengths over a wide range in accordance with the orders at hand, to cut the metal cleanly and without bending or tearing, and to operate at high speed.

I employ a rotary shear, such as is shown, for example, in my Patent No. 1,749,430, March 4, 1930. Where a rotary shear is employed, a feed means, such as a pair of pinch rolls, has been employed to feed the strip to the shear. It has been proposed to operate the feed rolls and the shear at different adjusted speeds in order to obtain the cut length. Unfortunately, any material difference between the shear speed and the strip speed at the instant of cutting adversely affects the operation. During the time period in which the actual cutting takes place the strip is held by the shear blades and no differential movement lengthwise of the strip should occur. If the feed rolls are set to impose on the strip a speed higher than the forward movement of the shear blades at the instant of cutting, either the strip must buckle or there must be slippage between the strip and the feed rolls. Similarly, if the feed rolls are set to impose upon the strip a speed less than the forward speed of the shear blades at the instant of cutting, either the strip must tear apart, be drawn forward with slippage through the feed rollers, or possibly be advanced from a slight loop.

These practices may result in an inferior cut edge, e. g., torn or locally bent, surface scratches, or irregularities in cut length.

In Edwards Patent No. 1,599,880, September 14, 1926, it was proposed to operate a rotary shear at a base speed and to impose upon the shear at the time of cutting a pulsing speed so that the shear is momentarily accelerated [or decelerated] to a speed the same as that of the strip and, after cutting, is decelerated [or accelerated] to the base speed. The arrangement proposed is not satisfactory for modern day requirements. It cannot be operated at the speeds desired or with the accuracy required by modern day standards, nor can it be adjusted to cut a sufficiently wide range of lengths.

My invention operates on a diametrically opposite principle. I run the shear at a uniform speed and accelerate and decelerate the strip itself. I have discovered, contrary to what might be supposed, that the strip can be accelerated and decelerated without scratching or setting up waves or buckles in it which would affect the accuracy of the cut length, and that materially increased operating speeds with resultingly greater output and reduced costs, within very close length tolerances, and with no impairment of surface, can be achieved.

In the accompanying drawings, illustrating a present preferred embodiment of the invention, Fig. 1 is a top plan view of a rotary shear with associated feeding and driving mechanism;

Fig. 2 is a side elevation;

Fig. 3 is an end elevation;

Fig. 4 is a top plan view, partly broken away, showing some of the gear mechanism employed;

Figure 5:
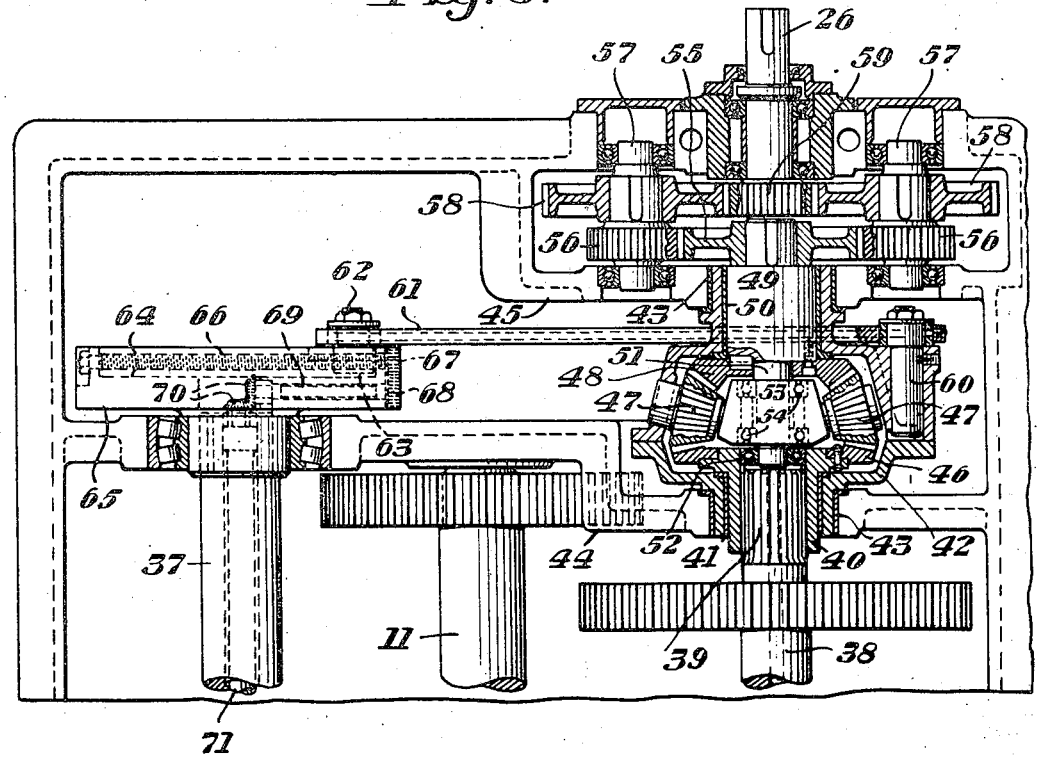
Fig. 5 is a detailed sketch showing the gear mechanism for imparting the pulsing motion to the strip.

The general arrangement of the mechanism is best shown in Figs. 1 and 2. A strip S of indeterminate length, which it is desired to cut into short pieces and which may be supplied from any convenient source, e. g., a feed reel, is supplied through pinch rolls 2, which are driven at constant adjusted speed by old and well-known mechanism. In Fig. 1 I have diagrammatically illustrated the drive as consisting of a gear mechanism 3, driven by a variable speed motor 4, whose speed is adjusted by a controller 5.

The strip issuing from the pinch rolls 2 passes through a feed mechanism, indicated generally by the reference character 6, sufficient slack being left between the pinch rolls 2 and the feeder 6 to form a loop L. The strip passes from the feeder 6 over a table 7 to a rotary shear 8. The feeder 6 and the shear 8 are driven by a motor 9 through a chain belt 10 connected to the shaft 11 of a gear drive mechanism indicated generally by the reference character 12.

The feeder 6 is of the roller leveler type, having a series of upper rolls 13 and lower rolls 14 in staggered relation. The rolls 14 may be vertically adjusted by hand wheels 15, as may be desirable for feeding strips of different gauge. A pair of pinch rolls 16 is provided at the entering end of the feeder. A billy roll 17 is provided to support the adjacent end of the loop L and guide rollers 18 are provided near the billy roll for keeping the strip in line.

The rolls 17 and 18 are idle, but the rolls 13, 14 and 16 are all driven. The rolls 14 and the rolls 16 are driven by a shaft 19 extending longitudinally of the machine through spiral gears not shown. The rolls 13 are driven through a corresponding shaft 20 on the opposite side of the machine. The shafts 19 and 20 are connected through shafts 21 having universal joints 22, to drive shafts 23, which are in turn connected through gearing not shown to a shaft 24, this shaft being aligned with and connected through a coupling 25 to a shaft 26 in the gear drive 12.

The shear 8 consists of a housing 27, an upper shear head 28 and a lower shear head 29. The head 28 is provided with a single cutting blade 30. The head 29, in the embodiment shown, has a diameter twice as great as the head 28, and is provided with diametrically opposite knives 31. If desired, one of these knives may be removed, as more fully described in my prior Patent No. 1,749,430. The heads 28 and 29 are connected together by gears 32 and the shaft of the head 28 is connected through a coupling 33 to a shaft 34 in the gear drive 12.

A caster table 35 is provided for facilitating passage of the cut lengths from the shear.

Figure 6:
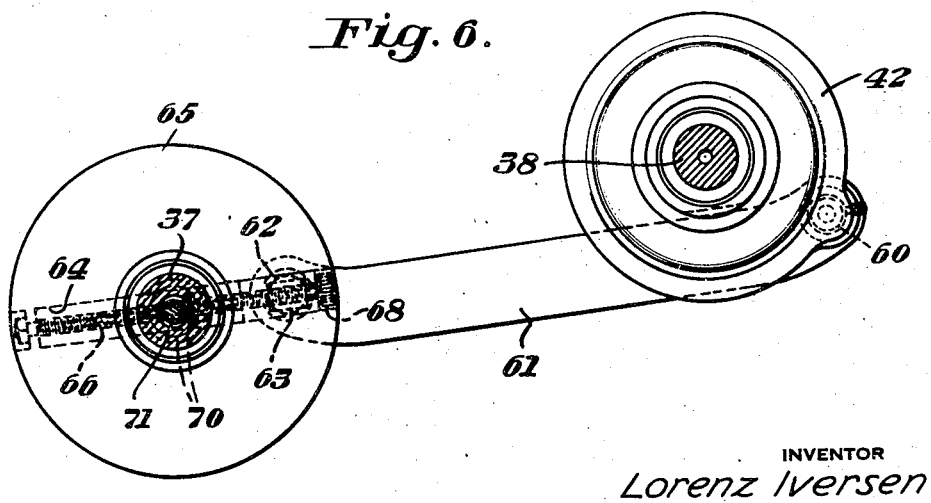
Fig. 6 is an elevation of a crank mechanism, shown in Fig. 5, and constituting a portion of the pulsing drive.

The details of the gear drive mechanism 12 are shown in Figs. 4 to 6 inclusive.

As has been above described, power is supplied from the motor 9 to the shaft 11. The shaft 34 is driven from the shaft 11 through change-gears indicated generally by the reference character 36, so as to provide a series of desired speed ratios between the shafts. A parallel shaft 37 is driven from the shaft 34 through supplemental change-gears 37a and 37b. Another parallel shaft 38 is also connected to the shaft 11 through change-gear mechanism 36a. The details of change-gear mechanisms are old and well-known and therefore are not here described in detail.

The shaft 38 has a splined end 39 which fits into a sleeve 40 rotating in a bearing 41. The bearing 41 is carried by a differential case 42, which, in turn, is rotatably mounted in bearings 43 carried by supporting webs 44 and 45 integral with the housing of the gear drive mechanism. The sleeve 40 carries a bevel gear 46 meshing with pinions 47, which, in turn, mesh with a bevel gear 48. The bevel gear 48 is mounted on a stub shaft 49 rotatable in a bearing 50 formed in the differential housing 42, the shafts 38 and 49 being co-axial. The shaft 49 has a portion 51 of reduced diameter which extends through the differential housing 42, and is carried by a ball-bearing 52 carried at the inner end of the sleeve 40. The shaft portion 51 serves to carry a block 53 through the medium of ball-bearings 54. The pinions 47 are journaled at their inner ends in the block 53 and at their outer ends in the casing 42.

Assuming for the moment that the differential housing 42 is held against rotation, rotation of the shaft 38 at constant speed causes rotation of the stub shaft 49 at a constant but somewhat higher speed in the opposite direction. The outer end of the shaft 49 carries a gear 55 meshing with pinions 56 on stub shafts 57. Gears 58 on the stub shafts 57 mesh with a pinion 59 on the inner end of the shaft 26. This gearing (still assuming that the differential housing 42 is held against rotation) serves to drive the shaft 26 at a constant base speed which may be adjusted relatively to the speed of the shaft 11 through the change-gear mechanisms 36 and 36a. As already described, the shaft 26 drives the feed mechanism 6. Consequently, by adjustment of the change-gear sets, a wide range of relative speed as between the shear speed and the base speed of the feed mechanism may be obtained. In this fashion, as well as by the expedient of using one or both shear knives in the lower shear head 29, a wide variety of cut lengths may be obtained.

It still remains to impose a pulsing speed on the feed mechanism so that the forward speed of the stock and the peripheral speed of the shear blades is substantially the same at the instant of cutting. This pulsing speed is obtained by oscillating the differential housing 42. To this end the housing 42 is provided with a crank pin 60 carrying a connecting rod 61 whose opposite end is carried by a crank pin 62 mounted on and rotated by the shaft 37. Consequently, on each rotation of the shaft 37 the differential housing 42 will be oscillated.

It has already been stated that one or both of the shear knives 31 may be employed, depending upon the length requirements of the product. If both knives 31 are employed, it is necessary to pulse the feed mechanism for each rotation of the upper shear head 28, but if only one knife 31 is employed, cutting occurs only on each other rotation of the head 28, and consequently only one pulse for each two revolutions of the head is required. The change-gears 37a have a 1-to-1 ratio and when these gears are meshed, as shown in Fig. 4, the feed mechanism will be pulsed on each revolution of the head 28; or, to state it in another way, on each half-revolution of the head 29. The change-gears 37b have a 1-to-2 ratio and these will be meshed when but a single shear knife 31 is employed, thus pulsing the feed only on every other revolution of the head 28; i. e., on each revolution of the head 29.

The phasing of the pulse is determined by the initial annular setting of the shafts 34 and 37, this being effected by meshing the proper teeth of the gears 37a during assembly. It will be seen from Fig. 4 that the shaft 34 has a keyway. This keyway, and a corresponding keyway (not shown) in the shaft of the shear head 28, are engaged by the coupling 33 so that the shear and the drive can only be coupled with the shear knife 30 in a predetermined angular relationship. Therefore, with the gears 37a or 37b meshed in the proper relationship, the shear will be properly phased.

The change-gears 37a and 37b are so related that both pairs are never out of mesh at the same time during a changeover from one set to the other, and this insures that the pulsing will be kept in the proper phase.

The amount of pulsing and its direction, i. e., whether there is acceleration followed by deceleration, or, alternatively, deceleration followed by acceleration, are controlled by adjustment of the crank pin 62. To this end it is carried on a block 63 adjustable in a T-slot 64 extending diametrally across a head 65 on the shaft 37. The block 63 is threaded to receive a screw 66 rotatably mounted in the head 65 and lying in the T-slot 64. One end of the screw 66 carries a pinion 67 meshing with a pinion 68 on a shaft 69 also carried in the head 65. The shaft 69 is connected through miter gears 70 to an adjusting shaft 71. The shaft 37 is made hollow to accommodate the shaft 71. It terminates in a handwheel 72 provided with a locking wheel 73. By this mechanism the throw of the crank, and therefore the amount of rotation of the differential housing 42 for each rotation of the shaft 38, may be adjusted. When the differential housing 42 is thus oscillated, the pinions 47, while continuing to transmit the rotary movement of the shaft 38 to the shaft 26, impose an additional pulsing movement on the shaft 49 and thence on the shaft 26. By adjusting the throw of the crank pin 62, this pulsing movement may be adjusted so as to bring the strip speed and the shear knife speed into substantial equality at the instant of cutting. If the crank pin 62 is adjusted to one side of the axis of the head 65, the pulsing movement will be one of acceleration of the shaft 26, followed by deceleration, but if the crank pin is positioned at the other side of the axis, the pulsing movement will be one of deceleration, followed by acceleration. This arrangement permits of equalizing the shear and strip speeds at the moment of cutting over an exceptionally wide range.

My invention has many advantages. An improved new result, namely, materially increased operating speeds with resultingly greater output and reduced costs, is achieved. An extremely wide range of cut lengths can be achieved in a single installation. The cutting can be held to very close length tolerances without any impairment of surface. Strips of high surface finish, whether they be of ferrous metal or of softer metals, or coated products such as tin plate, are not impaired. The mass and distribution of mass of the strip and the apparatus parts which are to be accelerated and decelerated are such that relatively low inertia forces are involved; the feed rolls, being of small diameter and little mass relatively to the shear heads, have collectively a low moment of inertia relatively to the moment of inertia of the rotary shear. It is therefore possible to vary the strip speed rapidly. The entire apparatus operates smoothly with long life and with little wear.

I have illustrated and described a present preferred embodiment of the invention, but it will be understood that this is by way of illustration only and that the invention may be otherwise embodied or practiced within the scope of the following claims.

I claim:

1. In the shearing of metal strip with a rotary shear having a strip-cutting knife, the steps consisting in rotating the shear at a substantially constant speed, advancing the strip at a base speed different from the shear speed, adjusting the base speed and thereby determining the cut length, and temporarily varying the strip speed so as to make it substantially the same as the shear knife speed at the moment of cutting.

2. In the shearing of metal strip with a rotary shear having a strip-cutting knife, the steps consisting in rotating the shear at a substantially constant speed, advancing the strip at a base speed different from the shear speed, and temporarily varying the strip speed so as to make it substantially the same as the shear knife speed at the time of cutting.

3. In the shearing of metal strip with a rotary shear having a strip-cutting knife, the steps consisting in rotating the shear at a substantially constant speed, advancing the strip at a base speed different from the shear speed, adjusting the relative shear speed and base speed to determine the cut length of the strip, and temporarily varying the strip speed so as to make it substantially the same as the shear knife speed at the time of cutting.

4. In the feeding and shearing of metal strip with a rotary shear having a strip-shearing knife and a roller-leveler with rollers characterized by a low moment of inertia relatively to the moment of inertia of the rotary shear, the steps consisting in rotating the shear at substantially constant speed, supplying metal strip to the roller-leveler, driving the roller-leveler to feed the strip to the shear, varying the speed of the leveler rollers so as to advance the strip at a variable speed, and advancing the strip at the time of cutting at a speed substantially the same as the speed of the shear knife.

5. In the feeding and shearing of metal strip with a rotary shear having a strip-shearing knife and a roller-leveler with rollers characterized by a low moment of inertia relatively to the moment of inertia of the rotary shear, the steps consisting in rotating the shear at substantially constant speed, supplying metal strip to the roller-leveler, driving the roller-leveler to feed the strip to the shear, operating the leveler rollers at a base speed different from the shear speed, and temporarily varying the speed of the leveler rollers so as to advance the strip at a variable speed and advancing the strip at the time of cutting at a speed substantially the same as the speed of the shear knife.

6. In the feeding and shearing of metal strip with a rotary shear having a strip-shearing knife and a roller-leveler with rollers characterized by a low moment of inertia relatively to the moment of inertia of the rotary shear, the steps consisting in rotating the shear at substantially constant speed, supplying metal strip to the roller-leveler, driving the roller-leveler to feed the strip to the shear, operating the leveler rollers at a base speed different from the shear speed, adjusting the relative shear speed and base speed to determine the cut length of the strip, and temporarily varying the speed of the leveler rollers so as to advance the strip at the time of cutting at a speed substantially the same as the speed of the shear knife.

7. Apparatus for shearing metal strip comprising a rotary shear having a shear knife, means for driving the shear at a substantially constant speed, a strip feeder, and means controllable independently of the strip movement for driving the feeder so as to supply strip to the shear at a speed which varies but which substantially equals the speed of the shear knife at the time of cutting.

8. Apparatus for shearing metal strip comprising a rotary shear having a shear knife, means for driving the shear at a substantially constant speed, a roller-leveler alined with the shear and arranged to feed strip thereto, and means controllable independently of the strip movement for driving the roller-leveler so as to supply strip to the shear at a speed which varies but which substantially equals the speed of the shear knife at the time of cutting.

9. Apparatus for shearing metal strip comprising a rotary shear having a shear knife, a strip feeder, means for driving the shear at a substantially constant speed, means for driving the feeder at a base speed, and means for varying the base speed at the time of cutting so as to advance the strip at such time at a speed which substantially equals the speed of the shear knife.

10. Apparatus for shearing metal strip comprising a rotary shear having a shear knife, feed rollers for feeding strip to the shear, and a common drive mechanism for the shear and the feed rolls, the drive mechanism including means for driving the shear at a substantially constant speed, means for driving the feed rolls at a base speed different from the shear knife speed, and means for modifying the speed of the feed rolls so that at the time of cutting they are advancing the strip at a speed which substantially equals the speed of the shear knife.

11. Apparatus for shearing metal strip comprising a rotary shear having a shear knife, feed rollers for feeding strip to the shear, and a common drive mechanism for the shear and the feed rolls, the drive mechanism including means for driving the shear at a substantially constant speed, means for driving the feed rolls at a base speed different from the shear knife speed, means for relatively varying the shear speed and the feed roll speed, and means for modifying the speed of the feed rolls so that at the time of cutting they are advancing the strip at a speed which subsantially equals the speed of the shear knife.

LORENZ IVERSEN.

REFERENCES CITED

The following references are of record in the file of this patent:

UNITED STATES PATENTS

| Number | Name | Date |
| --- | --- | --- |
| 1,961,538 | Weber | June 5, 1934 |
| 1,859,336 | MacChesney et al. | May 24, 1932 |
| 2,118,402 | Hallden | May 24, 1938 |